United States Patent
Namboodiri et al.

(10) Patent No.: US 9,535,929 B2
(45) Date of Patent: Jan. 3, 2017

(54) METHOD AND ARRANGEMENT FOR IMAGE RETRIEVAL BASED ON MULTIPLE IMAGES

(71) Applicant: Alcatel Lucent, Boulogne Billancourt (FR)

(72) Inventors: Vinay Namboodiri, Mumbai (IN); Mohamed Ali Feki, Brussels (BE); Erwin Six, Kalken (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/653,120

(22) PCT Filed: Dec. 17, 2013

(86) PCT No.: PCT/EP2013/076898
§ 371 (c)(1),
(2) Date: Jun. 17, 2015

(87) PCT Pub. No.: WO2014/095860
PCT Pub. Date: Jun. 26, 2014

(65) Prior Publication Data
US 2015/0302028 A1    Oct. 22, 2015

(30) Foreign Application Priority Data

Dec. 20, 2012  (EP) .................................... 12306631

(51) Int. Cl.
*G06K 9/68* (2006.01)
*G06F 17/30* (2006.01)
*G06K 9/62* (2006.01)

(52) U.S. Cl.
CPC ... *G06F 17/30256* (2013.01); *G06F 17/30244* (2013.01); *G06K 9/6215* (2013.01); *G06K 9/68* (2013.01)

(58) Field of Classification Search
CPC ................... G06F 17/30247; G06F 17/30784; G06F 17/3053; G06F 17/30864;
(Continued)

(56) References Cited

U.S. PATENT DOCUMENTS 6,606,623 B1 * 8/2003 Hsieh ................ G06F 17/30256
707/765
8,438,163 B1 * 5/2013 Li ........................ G06F 17/3028
382/159
(Continued)

OTHER PUBLICATIONS

John C. Chiang et al., "Multiple-Instance Image Database Retrieval by Spatial Similarity Based on Interval Neighbor Group," Proceedings on the ACM International Conference on Image and Video Retrieval, pp. 135-142, XP055106688, 2010.
(Continued)

*Primary Examiner* — Vu Le
*Assistant Examiner* — Aklilu Woldemariam
(74) *Attorney, Agent, or Firm* — Fay Sharpe, LLP

(57) ABSTRACT

A Method for retrieving at least one image from a database (DB) of images based on at least two input images (image i, image j), comprises the steps of determining (120) first low level feature correspondences (LC1) between said at least two input images (image i, image j), searching (200) within said database (DB) for at least two sets (Mi, Mj) of images respectively matching said at least to images (image i, image j), determining (120) second low level features correspondences (LC2) between respective images from said at least two sets of images (Mi, Mj), determining (130) a first set of relationships (RLC1) between entities of said at least two input images (image i, image j) based on said first low level feature correspondences (LC1), determining (130) a second set of relationships (RLC2) between respective entities of said respective images from said at least two sets of images (Mi, Mj) based on said second low level feature correspon-
(Continued)

dences (LC2), identifying (300) matching relationships between said first set of relationships (RLC1) and said second set of relationships (RLC2), checking (400) the quality of the matching relationships, and, if matching relationships of sufficient quality are found, retrieving (500) the at least one image corresponding to the matching relationships of said second set from said database, and providing said at least one image of said second set as output.

8 Claims, 6 Drawing Sheets

(58) Field of Classification Search
CPC .................. G06F 17/30265; G06F 17/30047; G06F 17/30746; G06F 17/30244; G06F 17/30755; G06F 17/30256; G06F 17/30026; G06F 17/3079; H04N 2201/3252; H04N 1/00005; H04N 1/00068; H04N 1/32144; H04N 1/32149; H04N 21/4622; H04N 19/154; H04N 1/321149; G06K 9/6256; G06K 9/6255; G06K 9/036; G06K 9/0064; G06K 2209/21; G06K 9/00664; G06T 7/0065; G06T 5/50; G06T 7/0022; G06T 7/0028; G06T 2207/20101; G06T 2207/30168; G06T 7/004; A63F 2300/61; Y10S 707/915; Y10S 707/99935; Y10S 707/99945; Y10S 707/99936; H04L 51/32; H04L 41/147; H04L 63/104; G06Q 10/10; G06Q 30/0201; G06Q 30/0629; G01J 3/453; H04H 60/46; H04W 4/025; G11B 27/28
USPC ........ 382/118, 159, 181, 224; 707/766, 737, 707/765, 915
See application file for complete search history.

(56) References Cited

U.S. PATENT DOCUMENTS

| 2005/0105798 | A1* | 5/2005 | Nguyen | G06F 17/30247 382/181 |
| 2009/0287620 | A1* | 11/2009 | Xu | G06K 9/00248 706/12 |
| 2011/0123071 | A1* | 5/2011 | Shah | G06K 9/00288 382/118 |
| 2011/0200260 | A1 | 8/2011 | Chin et al. | |
| 2012/0027290 | A1* | 2/2012 | Baheti | G06K 9/6857 382/154 |
| 2013/0236110 | A1* | 9/2013 | Barrus | G06K 9/00463 382/224 |
| 2013/0322750 | A1* | 12/2013 | Agarwal | G06K 9/4652 382/165 |
| 2014/0223309 | A1* | 8/2014 | Boiman | G11B 27/28 715/723 |
| 2015/0169634 | A1* | 6/2015 | Li | G06F 17/3028 707/723 |

OTHER PUBLICATIONS

Minsu Cho et al., "Co-recognition of Image Pairs by Data-Driven Monte Carlo Image Exploration," 10$^{th}$ European Conference on Computer Vision, pp. 144-157, XP019109312, Oct. 12, 2008.

Kyle Heath et al., "Image Webs: Computing and Exploiting Connectivity in Image Collections," 2010 IEEE International Conference on Computer Vision and Pattern Recognition, pp. 3432-3439, XP031725820, Jun. 13, 2010.

Barbara Zitova et al., "Image registration methods: a survey," Image and Vision Computing, vol. 21, No. 11, pp. 977-1000, Oct. 2003.

International Search Report for PCT/EP2013/076898 dated Mar. 24, 2014.

* cited by examiner

METHOD AND ARRANGEMENT FOR IMAGE RETRIEVAL BASED ON MULTIPLE IMAGES

The present invention relates to a method for retrieval of one or more images from a database, based on user-input images, which method can be used in daily life situations, such as in situations for obtaining e.g. assistance in buying or knowing more information about a product.

Such real life use cases generally require searching for an image, possibly further accompanied with more information itself, based on an image which usually has not optimal optical conditions of focus, resolution, centering of the object of which information is searched for, . . . as these pictures are e.g. taken on the fly with a mobile phone.

Present methods for retrieving one or more images based on an input image only accept a single image and try to retrieve further relevant images based on pure distance based measures from huge databases of images. The images that the user however uses in the practical cases as mentioned e.g. for assistance or information purposes, usually involve novel images taken by a user from his/her own camera in his/her daily life experience. Retrieving information based on such an input image is therefore a hard problem to solve, especially if this image is not accompanied by relevant metadata such as an explanatory text or description. Present image retrieval tools therefore often confuse the novel image with other unrelated images during the search process such that the result is very poor.

It is therefore an object of embodiments of the present invention to present a method and an arrangement for retrieving information based on images, which is much more accurate compared to the present methods.

According to embodiments of the present invention this object is achieved by a method for retrieving at least one image from a database of images based on at least two input images, said method comprising the steps of determining first low level feature correspondences between said at least two input images, searching within said database for at least two sets of images respectively matching said at least to images, determining second low level features correspondences between respective images from said at least two sets of images, determining a first set of relationships between entities of said at least two input images based on said first low level feature correspondences, determining a second set of relationships between respective entities of said respective images from said at least two sets of images based on said second low level feature correspondences, identifying matching relationships between said first set of relationships and said second set of relationships, checking the quality of the matching relationships, and, if matching relationships of sufficient quality are found, retrieving the at least one image corresponding to the matching relationships of said second set from said database, and providing said at least one image of said second set as output.

In this way the accuracy is significantly improved compared to prior art methods.

In an embodiment, another search is performed if no sufficient matching relationships are found, such as to obtain at least two further sets of images matching said at least to image for replacing said at least two initial sets.

This will further add to the accuracy.

The present invention relates as well to embodiments of an arrangement for performing this method, for image or video processing devices incorporating such an arrangement and to a computer program product comprising software adapted to perform the aforementioned or claimed method steps, when executed on a data-processing apparatus.

In an embodiment the arrangement may comprise means to receive at least two input images, means to determine first low level feature correspondences between said at least two input images, means to search within said database for at least two sets of images matching said at least to images, means to derive second low level features correspondences between respective images from said at least two initial sets of images, means to determine a first set of relationships between entities of said at least two input images based on said first low level feature correspondences, means to determine a second set of relationships between respective entities of said respective images from said at least two initial sets of images based on said second low level feature correspondences, means to identify matching relationships between said first set of relationships and said second set of relationships, means to check the quality of the matching relationships, and, if matching relationships of sufficient quality are found, means to retrieve the at least one image corresponding to the matching relationships of said second set from said database, and means to providing said at least one image of said second set on an output of said arrangement.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

The above and other objects and features of the invention will become more apparent and the invention itself will be best understood by referring to the following description of an embodiment taken in conjunction with the accompanying drawings wherein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Figure 1:
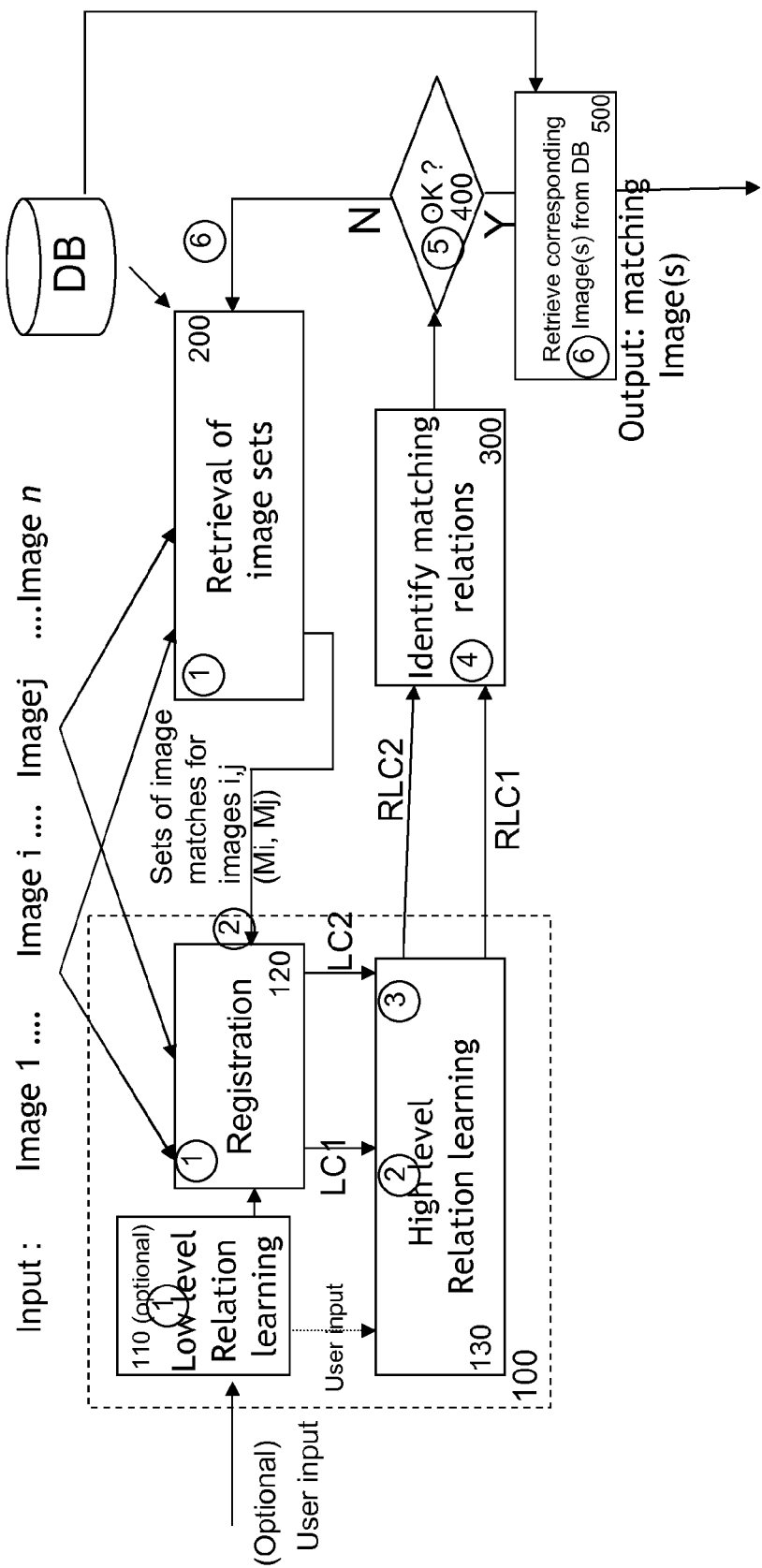
FIG. 1 shows a first high level embodiment of the method.
Figure 6:
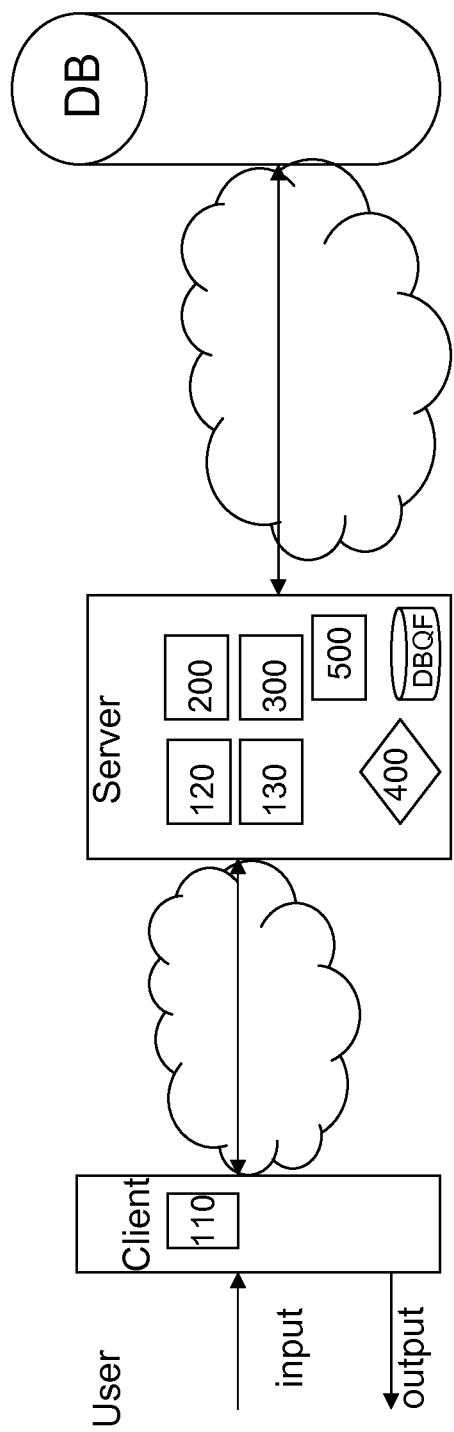
FIG. 6 shows an architecture with a client-server approach of a network implementation of the method and/or arrangement.

FIG. 1 shows a high-level scheme of an embodiment of an arrangement and a corresponding method. In contrast to the present techniques it makes use of two or more input images, denoted image 1 to image n, instead of only one used in the state of the art techniques. These images are provided as an input to the arrangement. In an embodiment the arrangement may only comprises a single device adapted to receive the user inputs, to determine therefrom a matching image, and to provide this back on an output to the user. In other embodiments the arrangement comprises a client and a server which are communicatively coupled to each other, and in which the client is adapted to receive the user inputs, to provide these to the server, to receive the determined matching images back from the server, and to provide them back to the user via a user interface. This architecture is shown in FIG. 6 and will be further discussed into detail in a later paragraph.

The input images are provided by the user to the arrangement, thus either to the client when a client/server approach is used, or to a user interface of the server in case the arrangement only comprises a server.

In an embodiment the images are treated in pairs of two. However in other embodiments more than two images are treated simultaneously.

In the embodiment depicted in FIG. 1 two images image i and j are selected from the n input images provided. The selection can be based on additional user inputs, or, alternatively in case of no user inputs, all combinations of 2 out of n images are considered.

However in other embodiments other combinations or selections can thus be used. This is thus possible based on optional further user inputs which can e.g. already specify some relationships between the images, or even indicate which ones of the n images are the most relevant according to the user. These optional user inputs are provided to module 110 on FIG. 1, which thus receives from the user information with respect to possible relationships between the images such as "the object of image 2 is comprised within the object of image 1" or the like. Another example may be: "the object of image 1 are adjacent the object of image 2".

This selection and/or consideration of the combination of 2 out of n input images is not shown in FIG. 1; in this figure it is schematically shown that two images i and j are selected for being further analyzed and used for retrieving a matching image from an image database DB. This image database can be a private image database and being comprised within the arrangement, or can be a database outside of the arrangement, or a combination of both. It can be a distributed database, distributed across several database servers which are all communicatively coupled with each other, and also with the image retrieval server or the image retrieval arrangement. In other embodiments this database can still be implemented on the same physical server as the image retrieval server.

In case of a remote database, it can be coupled via any type of communications network, being any type of wireless or wired network, to the image server.

In FIG. 6 this communications network is schematically represented by a cloud between the image retrieval server and DB. As previously mentioned DB itself can be distributed across many database servers, each again being communicatively coupled with the image retrieval server.

Returning back to FIG. 1, in a first step, denoted by a circled "1", image i and image j are provided in parallel to two modules 120 and 200 of the image retrieval server. A first module is denoted "registration" with reference sign 120, and it is adapted to receive both images, and to determine therefrom low level correspondences, denoted LC1. As is known by a person skilled in the art, registration is a specific term implying that feature correspondences, i.e. matching of feature points, are looked for. An implementation may comprise extracting dense feature points in image i and image j and matching them with dense correspondences. The procedure is similar to optical flow determination and is sometimes called SIFT flow. The idea is that the distance minimized is a combination of distance in space (i.e. x,y co-ordinate level matches) and distance of a feature-point (i.e. SIFT features are matched) and this is done with an optimization technique like graph-cuts or belief propagation so that the best matches between the two images is found. Therefore if there is e.g. a small cup and a big cup in the respective two input images then this is found by the low-level registration. This registration is done densely for all points.

Figure 2:
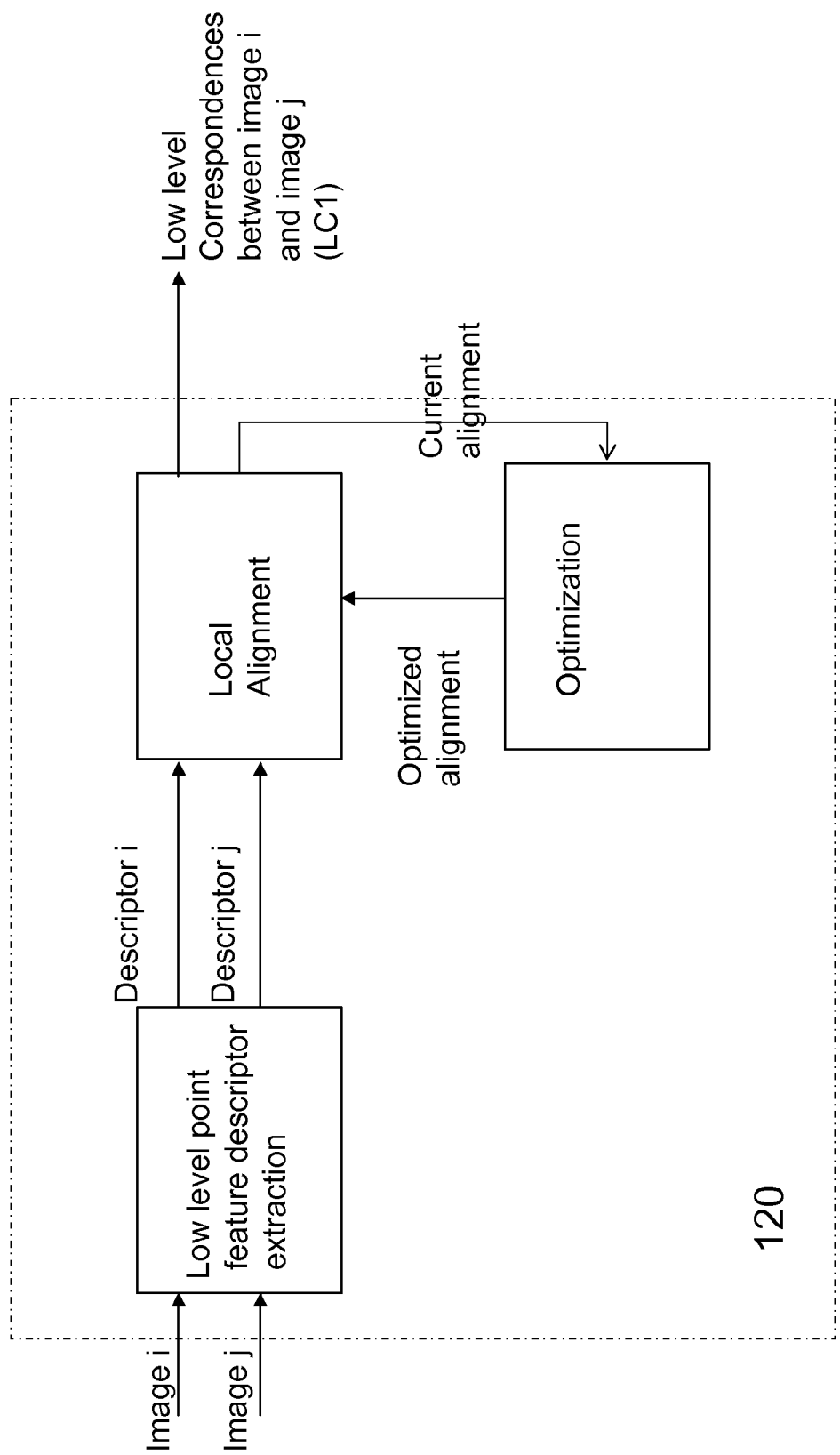
FIGS. 2 to 5 show more detailed embodiments of some modules of the embodiment depicted in FIG. 1.

A more detailed implementation of module 120 is shown in FIG. 2. Both images are provided to a low level point feature descriptor extractor, and the resulting descriptors, denoted descriptor i and descriptor j are then further aligned in a feedback loop, with aligning meaning looking for correspondences. The output are then the low level correspondences between image i and image j, also denoted LC1.

In parallel the set of images image i and j, is also provided to a first image retrieval block, 200, which is adapted to perform a first or initial retrieval of an image, based on the at least two input images it received. An implementation can again be based again on low-level sift features, just as the registration module 120. However, instead of a simple alignment as was present in module 120, a possible implementation of module 200 is now adapted to perform feature quantization.

Figure 4:
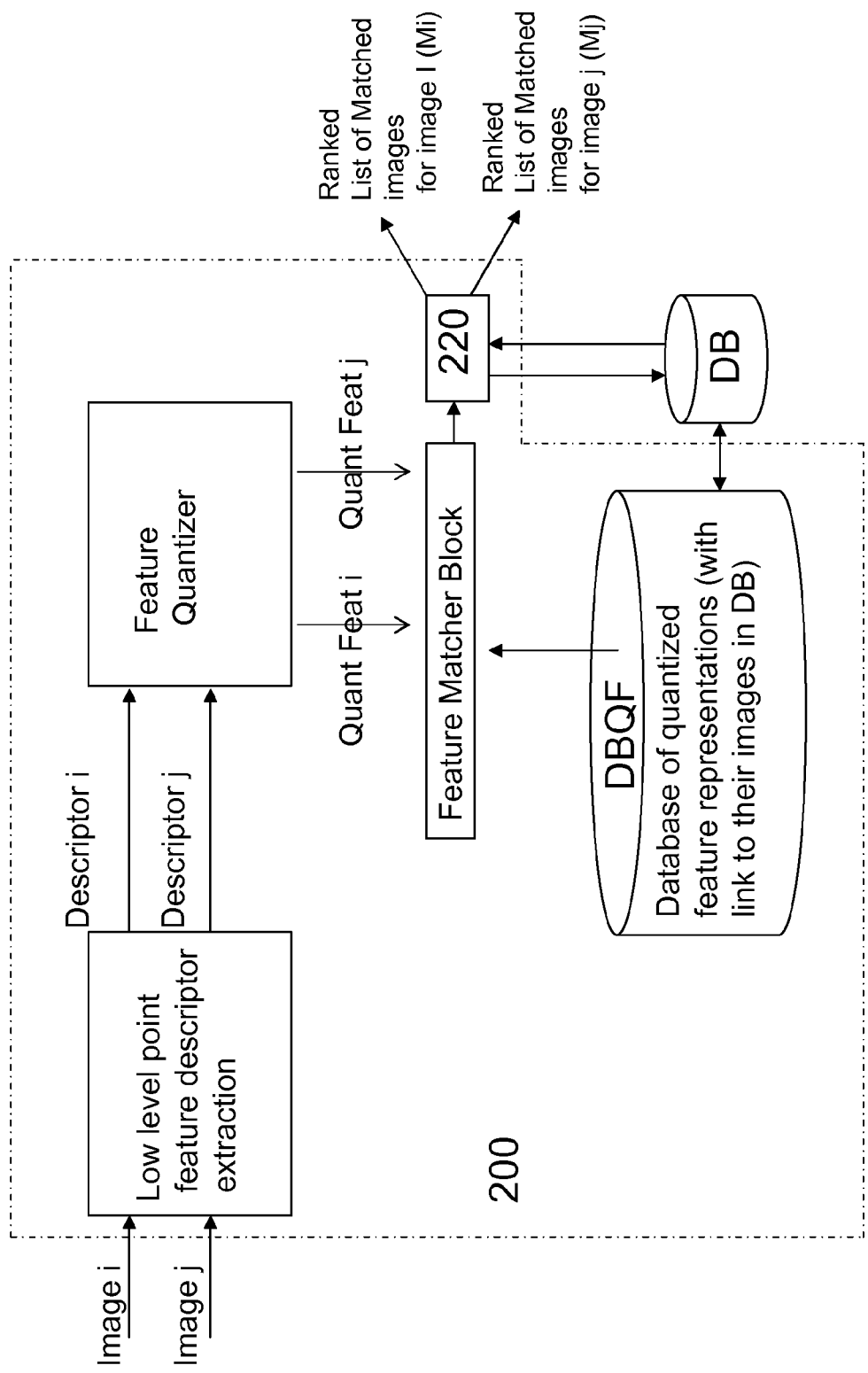

This is explained more into detail in FIG. 4, showing a detailed embodiment of module 200. In this implementation on both input images also low level point feature descriptors are extracted, and these are provided to a feature quantizer. A possible used procedure is to first have a visual vocabulary obtained using a k-means algorithm. They are then quantized to their nearest matching keyword from the visual vocabulary and the deviation from the nearest center is added into a deviation vector. Both deviation vectors are the output of the feature quantizer module, and are denoted "Quant Feat i" and "Quant Feat j" on FIG. 4, for respective images i and j. These quantized features are provided to a matching module, which is coupled to a database DBQF of quantized feature representations of all or part of the images of the database DB. This database DBQF may be coupled to database DB, but it is not needed during operation of the image retrieval method, and the determination and storage of all feature representations of images of DB has usually been performed earlier in an off-line step. The feature representations of these images of DB will then also contain an identifier to the address in DB such that the corresponding image can be retrieved based upon the quantized features.

Both quantized features i and j and then compared with all quantized feature representations present in database DBQF by means of a matching module denoted "feature matcher block", and the best results (which can easily mount to 30000 matching features per image i or j) are then provided to an image retrieval module 220, which is adapted to get from the matching features the corresponding images in the database of images DB. This can be performed based on a distance measure such as L2 norm, computing Euclidian and actually weighted Euclidian distance.

These results are denoted "ranked list of matched images for image i" and "ranked list of matched images for image j" and actually can comprise e.g. 1000 matching images per list or set, thus 1000 matching images for image i and 1000 matching images for image j. Together with this list of matching images, also the quality of the matching is provided, as indicated by means of a "ranking". In an embodiment the output of module 200 comprises for each input image i the feature points, the matching images as retrieved from DB, and the matching result of each image of the resulting set. These are denoted in short by "Mi" and "Mj" for respective input image i and j.

It is also to be remarked that, despite the fact that in FIG. 1 separate modules are indicated for performing several respective functions, the complete functionality of the arrangement can as well be performed by one single processor, or be distributed over different processors communicatively coupled with each other.

As already mentioned an optional action which can also be performed in this first time step, may be the receipt of further user inputs with respect to low-level relationships, in module 110.

In a second step, denoted by means of the circled "2" on FIG. 1, the previously determined lists of matching images Mi, Mj, are now also provided to the registration module 120, which is adapted to perform on them a similar operation as it previously did on image i and image j during the first time step.

However in this case a complete list of up to e.g. 10000 images of Mi and 10000 images of Mj can be input to 120. As the lists Mi, Mj can be ranked lists, with the highest matching images places before the lower one, a procedure can just be to take one-by-one, successive pairs of images of both lists Mi, Mj, and to provide them to the low level point feature descriptor extractor of module 120. However other selections and other combinations can be made, and this functionality is not shown in FIG. 2, but a person skilled in the art is aware how to provide this.

The result of this registration between Mi and Mj, is denoted LC2 and can thus comprise a high number of correspondences if all combinations of images of Mi and Mj are considered. In an embodiment only a limited number is started with, and in case sufficient correspondences are found, which can be identified by means of a measuring weight which can be checked against a certain threshold (also now shown in FIG. 2), the correspondence determination is stopped, e.g. the top 1000 matching relation pairs out of a possible combination of 1000 by 1000 image pairs.

An optional low level relation learning module 110 can thus also be present in a variant embodiment. Via this module, comprising a user interface, the user can already provide some metadata related to the images he or she provides to the arrangement, which metadata can further identify the object, or describe relationships between entities or features of the images such as "belongs to", "contains", "is part of", "is adjacent to", "needed for functioning of". The provision of this user input also takes place in the first step "1".

Figure 3:
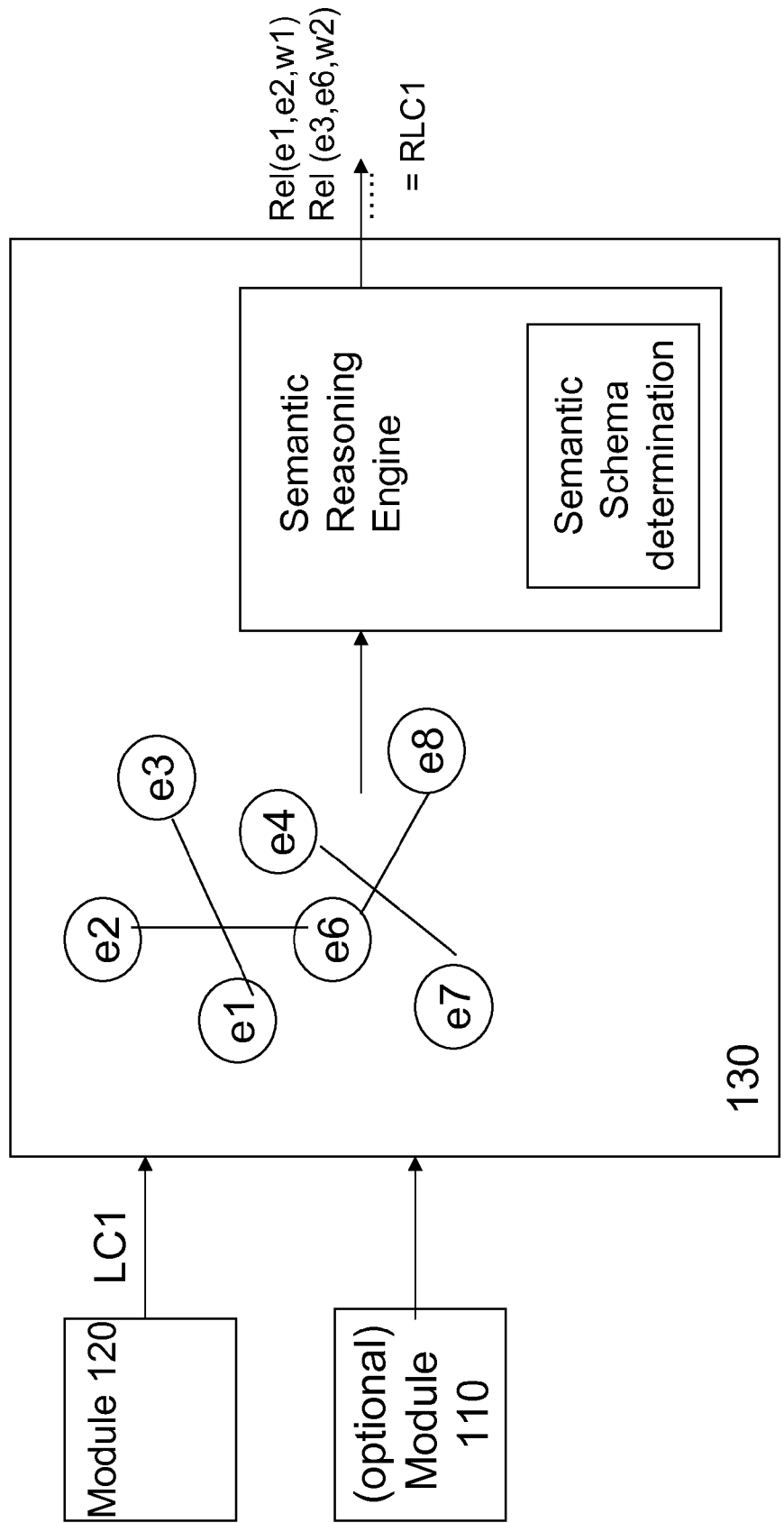

This user input is then provided in timestep "2" to another module 130, to which also the previous result LC1 of the registration for image i and j was provided. This block 130 is adapted to receive the low level entity matches as input along with optionally low-level relationships as provided by the user via user input module 110, and is adapted to use this information for generating therefrom more precise higher-level entity matches and relations between them. A possible detailed implementation of this module 130 is shown in FIG. 3. Module 130 processes the low level matches LC1 resulting from module 120, optionally also considers the user inputs from module 110, and builds from them a semantic graph of entities links. The graph will mention that two entities, with entity meaning a discovered feature or object of the images, are linked and attributes a label for each link/relation. This graph can be represented as $$G:=(E;R),$$

where E and R are the set of entities and relations respectively and (e1,r,e2) is a relation between e1 and e2, with e1 and e2 being elements of E, and r being an element of R.

E represents the set of possible visual entities or features according to a certain registration method defined in module 120.

A relation discovery strategy method performed by module 130 further exploits this graph to detect pairs of entities that have a certain type of relationship (relation type). Such relationships can be defined as tuples: Given two entities e1 and e2, a relationship between these entities is described via a tuple rel(e1; e2; type;w), where type labels the relationship, and w, being an integer belonging to the interval [0::1] is a weighting score that allows for specifying the strength of the relationship.

The higher the weighting score w the stronger the relationship between e1 and e2. If two entities are not related then the weight is 0.

Given the type of relationships that should be learnt, there exist three main design dimensions that influence the relation discovery. An optional filtering step based on the optional user inputs decides which links of the suggested maps between visual entities correspond to the available user inputs. This will further influence the accuracy to discover relationships. A challenge of the relation discovery is to compute the weight w, which expresses the strength of a relationship. Those pairs of entities that are, according to the given type of the relationship, strongly related should be weighted high while for rather unrelated entities the weight should be low. As one implementation example, we utilize the co-occurrence frequency of two entities as weighting scheme. Hence, given a certain data source (collected from wide user inputs when querying), we count the number of image queries in which both entities e1 and e2 are mentioned. The semantic reasoning engine comprised in module 130 is adapted to provide semantic relationships between entities that support various applications. Furthermore, it is envisaged to implement a higher level reasoning engine that infers more semantic relations following user defined rules. Rules are therefore coded based on first order logic and includes basic logic rules like transitivity and symmetry but also a possible inference rules toward enriching the semantic understanding of relations between entities. In the following an exemplary set of primary relations can serve as the basis of further inference:

SubType Relation: e1 is a subtype of e2
Functional Relation: e1 is used for e2
Implication Relation: The content of e1 will imply the content of e2
Cause-Effect Relation: e1 is the cause of e2
Instance Relation: e1 is an instance of e2
Sequential Relation: e1 happens before e2
Reference Relation: e2 explains further e1
Similar To Relation: e1 - - - (Similar To, sd) - - - e2: contents are similar with a certain degree of similarity
Spatial Relation: e1 is above, right, left, etc e2.

In FIG. 3 the relations between the entities or features in the images, together with their weights are shown as outputs of module 3. As mentioned before an entity concerns a recognized object or feature. The weights are an indication of the accuracy of the determined relationships, and are optional.

The thus obtained relationships between the features between both images i and j, are denoted RLC1. These will be provided to another module 300 in a third step or a fourth one, as module 300 has to process them together with the list of low level relation learning results LC2. These can only be determined by module 130 in a third step.

Module 300 is then adapted to receive all these relations, thus both the relations between the input images i and j, and all relations between combinations or selections thereof of the retrieved images for images i and j, and to match them, where the matching is based on distances of relations. A first level determines if the same relation exists and at the second level relation between the weights of the relations is considered. There are two kinds of distances possible, one is a 0-\theta distance, i.e. if the relation is the same then it is at distance 0 and matching between the relations is then determined by the weight, otherwise it is at distance \theta and the weight does not matter. Another distance can be based on ordering of relation.

Figure 5:
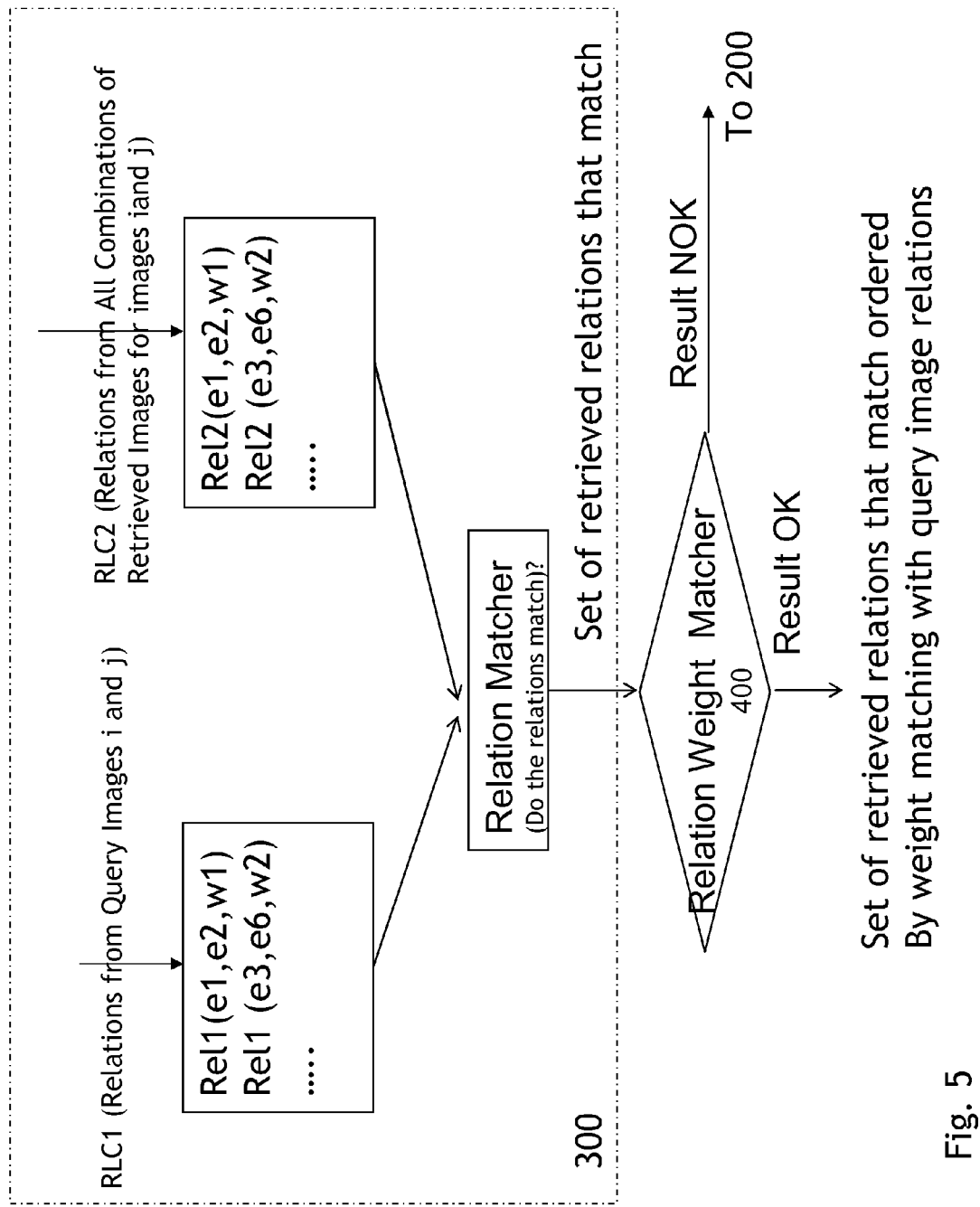

An implementation of this module is shown in FIG. 5, where all these relations are provided to a relation matcher, which then determines from them a set of retrieved relations that match.

These matching relations are further checked for sufficient quality, by checking their weights in step "5". This is performed by module 400. The result of module 400 is then a set of retrieved relations that match the relations between images i and j, with good quality as determined by their weights. Based on these matching relations the corresponding images are to be found by module 500 from the database. This can be done via the resulting relations when these contain an identifier or link to the image they belong to, and by analyzing this information such as to be able to retrieve the corresponding image. This is performed in step 6 upon which step the corresponding image or images are provided to the user on an output of the arrangement, in case the checking of the weights was such that the matching relationships were sufficiently close as expressed by a relatively high weight number.

In case however the analysis of the weights by module 400 indicated that the quality of the retrieved relations was not sufficient, this is communicated to module 200, such that another set of matching images is to be fetched by this module 200, whereupon the set of steps performed by modules 200, 120 (for this new retrieved sets of matches), 130 (for the new high level learning), and 300 (for searching for new matching relations) and 400 (for checking their weights) is to be performed all over again. The results earlier obtained on images i and j can be kept and re-used in this fine tuning procedure. These steps can be repeated until finally convergence occurs, meaning one or more sufficiently matching image are found.

While the principles of the invention have been described above in connection with specific apparatus, it is to be clearly understood that this description is made only by way of example and not as a limitation on the scope of the invention, as defined in the appended claims. In the claims hereof any element expressed as a means for performing a specified function is intended to encompass any way of performing that function. This may include, for example, a combination of electrical or mechanical elements which performs that function or software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for, and unless otherwise specifically so defined, any physical structure is of little or no importance to the novelty of the claimed invention. Applicant thus regards any means which can provide those functionalities as equivalent as those shown herein.

The invention claimed is:

1. A computer-implemented method for retrieving at least one image from a database of images based on at least two input images, said method comprising:
   determining, by one or more processors, first low level feature correspondences between said at least two input images;
   searching the one or more processors within said database for at least two sets of images respectively matching said at least two images;
   determining, by the one or more processors, second low level features correspondences between respective images from said at least two sets of images;
   determining, by the one or more processors, a first set of relationships between entities of said at least two input images based on said first low level feature correspondences;
   determining, by the one or more processors, a second set of relationships between respective entities of said respective images from said at least two sets of images based on said second low level feature correspondences and attributing a weighting score to said relationships;
   identifying in the one or more processors matching relationships between said first set of relationships and said second set of relationships;
   checking, in the one or more processors, the quality of the matching relationships, by checking their weighting score and, if matching relationships of sufficient quality are found, as expressed by a high weighting score against a threshold, retrieving the at least one image corresponding to the matching relationships of said second set from said database; and
   providing by the one or more processors said at least one image of said second set as output.

2. The computer-implemented method according to claim 1 wherein, if no matching relationships of sufficient quality are found, performing another search within said database for at least two further sets of images matching said at least two input images, replacing said at least two sets by said at least two further sets and repeating the steps on said at least two sets.

3. The computer-implemented method according to claim 1 wherein said at least two sets of images are retrieved from said database based on feature quantization matching.

4. The computer-implemented method according to claim 1 wherein said first set of relationships between entities of said at least two input images are determined using semantic reasoning.

5. The computer-implemented method according to claim 4 wherein said first set of relationships is further determined based on user inputs comprising information with respect to said relationships.

6. Image retrieval server for retrieving at least one image from a database of images based on at least two input images, said image retrieval server comprising:
   at least one or more processors configured to:
      determine first low level feature correspondences between said at least two input images;

search within said database for at least two sets of images respectively matching features of said at least two input images;

determine second low level features correspondences between respective images from said at least two initial sets of images;

determine a first set of relationships between entities of said at least two input images based on said first low level feature correspondences;

determine a second set of relationships between respective entities of said respective images from said at least two initial sets of images based on said second low level feature correspondences, and to attribute a weighting score to said relationships;

identify matching relationships between said first set of relationships and said second set of relationships;

check the quality of the matching relationships, by checking their weighting score, and, if matching relationships of sufficient quality are found, as expressed by a high weighting score against a threshold;

retrieve the at least one image corresponding to the matching relationships of said second set from said database; and provide said at least one image of said second set on an output of said image retrieval server.

7. A system comprising:

image retrieval server for retrieving at least one image from a database of images based on at least two input images, said image retrieval server including:

at least one or more processors configured to:
determine first low level feature correspondences between said at least two input images;
search within said database for at least two sets of images respectively matching features of said at least two input images;
determine second low level features correspondences between respective images from said at least two initial sets of images;
determine a first set of relationships between entities of said at least two input images based on said first low level feature correspondences;
determine a second set of relationships between respective entities of said respective images from said at least two initial sets of images based on said second low level feature correspondences, and to attribute a weighting score to said relationships;
identify matching relationships between said first set of relationships and said second set of relationships;
check the quality of the matching relationships, by checking their weighting score, and, if matching relationships of sufficient quality are found, as expressed by a high weighting score against a threshold;
retrieve the at least one image corresponding to the matching relationships of said second set from said database; and
provide said at least one image of said second set on an output of said image retrieval server; and
a client communicatively coupled to said image retrieval server and adapted to receive from a user said user input images for provision to said image retrieval server, and to receive from said image retrieval server said at least one image for provision to said user.

8. A non-transitory recording medium storing instructions which, when executed on a data-processing apparatus, perform the method of claim 1.

* * * * *